Patented July 12, 1949

2,476,129

UNITED STATES PATENT OFFICE 2,476,129

ESTERS OF PRODUCT OBTAINED BY REACTING PENTAERYTHRITOL AND THIODIGLYCOL

Frederick B. Augustine, Jefferson, N. J., assignor to Socony-Vacuum Oil Company, Incorporated, a corporation of New York No Drawing. Application July 3, 1947, Serial No. 758,982

10 Claims. (Cl. 260—399)

This invention relates to esters of reaction products formed by the interaction of pentaerythritol and thiodiglycol in the presence of an acid catalyst, and to a process of preparing these products. The products are particularly useful as plasticizers, coating compositions, resins, drying oils, synthetic lubricants and viscosity index improving agents.

Esters of pentaerythritol and polypentaerythritol are well known and are assuming increasing importance in such industries as the manufacture of alkyd resins and drying oils. An article by H. Burrell, Industrial and Engineering Chemistry, volume 37, page 86 (1945) not only indicates this trend but reveals advantages of esters of polypentaerythritols over esters of pentaerythritol. Polypentaerythritol, however, is not readily produced in quantity, occurring rather as a by-product in the preparation of pentaerythritol, and usually as a poorly defined mixture.

In a United States patent application, Serial No. 769,542, filed August 19, 1947, by Frederick P. Richter and Ebenezer E. Reid, coworkers of the present applicant, the reaction of pentaerythritol with thiodiglycol in the presence of an acid catalyst is described. This reaction appears to be in essence an etherification reaction, which is easily effected, and polyhydric condensation products of varied molecular size can expediently be prepared by regulation of the proportions of reactants and the reaction conditions.

In accordance with the present nivention, it has been discovered that the pentaerythritol-thiodiglycol reaction products prepared in accordance with the above-mentioned application can advantageously be substituted for pentaerythritols and polypentaerythritols in chemical syntheses such as those described by Burrell, supra, and may be substituted with particularly desirable results in esterification reactions such as those mentioned by Burrell.

The pentaerythritol-thiodiglycol products of this invention are liquid at lower temperatures, are more compatible with organic reagents, are more reactive at lower temperatures, are more susceptible to the control of their molecular size, and have many new and unpredictable properties due to their sulphur content, all as compared with pentaerythritol and polypentaerythritol.

REACTANTS

Pentaerythritol may be considered to be the primary reactant in the process of this invention. Inasmuch as the technical grade of pentaerythritol, which will normally be used in the process of this invention, probably contains di- or tri-pentaerythritols in lesser amounts, such mixtures are inherently a part of this invention. Purified pentaerythritol may be used if desired. Experimental work has indicated that dipentaerythritol and polypentaerythritols in general can be used but are not as satisfactory as is a material comprised principally of monopentaerythritol. Manipulation of mixtures of polypentaerythritols with thiodiglycol is difficult and unsatisfactory chiefly because of the large molecular size of the pentaerythritol polymer which creates too low a weight proportion of thiodiglycol. Thiodiglycol can be reacted with polypentaerythritol, however, by careful manipulation. The preferred primary reactant is therefore a material comprised mainly of pentaerythritol.

Thiodiglycol may be considered to be the secondary reactant. Again, a techincal grade of this compound may be used and such a material may and often will contain minor amounts of other compounds, such for example as dithiodiglycol. In fact, dithiodiglycol may be substituted either in whole or in part for the monothiodiglycol. Still other compounds containing two betahydroxyethyl sulphide radicals may be used. The preferred secondary reactant, however, is a material comprised, at least principally, of monothiodiglycol.

The esterification reagent may be any monocarboxylic acid, anhydride or acid chloride. Di- or poly-basic carboxylic acids, anhydrides or acid chlorides may be used, but since these tend to form high molecular weight condensation products, it is desirable to use, along with them, sufficient monocarboxylic acid, anhydride or acid chloride to regulate the molecular size of the product. Mixtures of two or more monocarboxylic acids, anhydrides or acid chlorides can also be used. Examples of esterification reactants are acetic acid, acetic anhydride, butyric acid, oleic acid, linoleic acid and mixtures of adipic and butyric acids. In general, it is preferred that the esterification reactant contain not less than two nor more than eighteen carbon atoms.

The use of an acid catalyst appears necessary during the reaction of the primary and secondary reactants and any of the catalysts mentioned in the Richter patent application, supra, appear to be satisfactory. In the examples which follow, p-toluene sulphonic acid monohydrate was used in an amount equal to 10% by weight of the thiodiglycol and this catalyst in this amount appears to be vary satisfactory.

The use of a catalyst does not appear to be necessary in the esterification reaction, although the presence of a catalyst during the esterification reaction is known to influence the esterification. It is within the scope of this invention to permit the catalyst used in the first reaction to remain in the product and thus aid in the esterification reaction, and it is also within the scope of this invention to add more of the same or other catalyst to speed the esterification.

REACTION CONDITIONS

The ratio of pentaerythritol, the primary reactant, to thiodiglycol, the second reactant, should be between about 0.3 and 0.9 mol of thiodiglycol per mol of pentaerythritol. Ratios of less than 0.5 presumably leave some pentaerythritol unreacted but the products are nevertheless of considerable value. With ratios lower than about 0.3, the weight per cent of thiodiglycol is too low to afford sufficient solvent power necessary to make the reaction easy to accomplish. With ratios approaching 1 and higher more or less soluble gels and high molecular weight condensation products are obtained, which esterify only with difficulty, if at all, and which are apt to break down into smaller units. This difficulty began to be evident, experimentally, at a ratio of 0.9.

In the esterification reaction it has, generally, been found desirable to have an excess of the esterifying reactant present over the amount that will react with the condensation product, but no very great excess appears to be necessary. In fact, if there is any danger that the pentaerythritol-thiodiglycol products may break down into smaller units, it is preferable not to have any great excess of the esterification reactant present, for such excess may tend to promote this cracking reaction. From one-half to three times the amount of esterification agent that will react, may be present. Amounts outside of these limits appear impractical from a commercial standpoint.

In reacting the pentaerythritol with thiodiglycol it is preferable to mix the pentaerythritol and thiodiglycol and raise the temperature of the mixture until an appreciable amount of the pentaerythritol dissolves in the thiodiglycol before adding the catalyst. Experimentally, the temperature necessary to accomplish this dissolving of the pentaerythritol in the thiodiglycol has been found to be about 145° C. to 175° C. This temperature has also been found satisfactory for the continuation of the reaction between the pentaerythritol and the thiodiglycol as well as for the subsequent esterification. However, in more difficult esterifications, as with the higher fatty acids, higher reaction temperatures, even as high as about 250° C. may be advantageous.

Because water is a by-product of both of the reactions, provision for the removal of water favors these reactions. The water may be allowed simply to distill out or, preferably, it may be carried out in a stream of inert gas. The use of a solvent or inert reaction medium which will absorb the water, and from which the water can be separated before reuse, is desirable especially when higher reaction temperatures are undesirable or when a water-soluble, low-boiling esterification reactant is employed.

The time necessary for the reaction between the thiodiglycol and pentaerythritol is best estimated by the amount of water evolved as is also the amount of time necessary for the esterification reaction. Usually, 0.5 to 1 hour is sufficient for the first reaction and 1.5 to 3 hours for the second.

Further details and advantages of this invention will be apparent from the following specific examples. In these examples a commercially available pentaerythritol of technical grade melting at about 210° C. to 235° C. was used. A technical grade of thiodiglycol was also used.

EXAMPLE I

OLEATE OF PENTAERYTHRITOL-THIODIGLYCOL PRODUCT

To the slurry or incomplete solution obtained by heating 73.5 g. of thiodiglycol (0.6 mol) and 109 g. of pentaerythritol (0.8 mol) to 145° C. was added 7 g. of p-toluene sulphonic acid monohydrate. Immediately, a clear solution resulted and water distilled out in the stream of nitrogen which was introduced. Within 20 minutes the calculated amount of water, 21.5 cc., had been collected. At this stage the polymeric product was a very viscous liquid, almost a gel. However, it was dissolved when 564 g. of oleic acid (2 mols) were added, and esterification took place at 165° C. as was evidenced by the distillation of water. A total of 30.5 cc. was collected in a reaction time of 40 minutes.

The crude product was dissolved in benzene, washed once with aqueous sodium carbonate solution and three times with water, and topped under vacuum, finally to 160° C. pot temperature at 4 mm. pressure. The residue, 618 g. or 90% of calculated yield, was a viscous oil. It is described further in Table I.

EXAMPLE II

BUTYRATE OF PENTAERYTHRITOL-THIODIGLYCOL PRODUCT

To a slurry of 136 g. of pentaerythritol (1 mol) in 61 g. of thiodiglycol (0.5 mol) at 175° C. was added 6 g. of p-toluene sulphonic acid monohydrate. Immediately a clear, non-viscous solution resulted and water was evolved rapidly until a total of 17 cc. had been collected.

To 60 g. of this polymeric product (⅙ of a calculated mol) were added 103 g. of butyric acid (1⅙ mols). A clear solution was obtained at 110° C. No catalyst was added although some toluene sulphonic acid may have remained after the etherification reaction. As the temperature was raised to 155° C. water and some butyric acid distilled in the stream of nitrogen provided. After final reaction at 145-155° C. for 50 minutes, the water content of the distillate was estimated to be 16 cc.

The reaction product, without further treatment, was topped to 190° C. pot temperature at 0.5 mm. pressure. A yield of 127 g., 97.5% of theoretical based on the intermediate polymer, was obtained as a water-white, neutral oil. Additional properties of this product are given in Table I.

EXAMPLE III

BUTYRATES OF OTHER PENTAERYTHRITOL-THIODIGLYCOL PRODUCTS

In Table I are listed the properties of the products described in Examples I and II as well as those of the butyrates of pentaerythritol polymerized more highly with thiodiglycol than in Example II, although otherwise similarly prepared. Also included for reference are the butyrates of technical pentaerythritol, technical dipentaerythritol and technical polypentaerythritol.

In Table II the use of the oleate of Example I as an additive for improving the viscosity index of an S. A. E. 10 grade lubricating oil is illustrated. It will be observed that improvement in the viscosity-temperature relationship results even at the lower concentrations.

Table I
PROPERTIES OF ESTERS OF MODIFIED PENTAERYTHRITOL

| Example No. | Type Ester | Reactant Mol Ratio | | Acid No.[1] | Sulphur | | Saponification No. | | K. V. Centistokes | | V. I. | ASTM Slope | Pour, °F. |
|---|---|---|---|---|---|---|---|---|---|---|---|---|---|
| | | Thiodiglycol | Pentaerythritol | | Calcd. | Found | Calcd. | Found | 100° F. | 210° F. | | | |
| | | | | | Percent | Percent | | | | | | | |
| I | Oleate | 3 | 4 | 4.5 | 2.8 | 3.0 | 163 | 158 | 175.3 | 23.16 | 133.5 | .541 | -15 |
| II | Butyrate | 1 | 2 | 1.5 | 4.1 | 4.3 | 430 | 431 | 72.8 | 9.74 | 119 | .671 | -50 |
| III | do | 2 | 3 | 1.2 | 5.6 | 5.6 | 393 | 400 | 129.9 | 15.14 | 120 | .629 | -45 |
| III | do | 3 | 4 | 1.2 | 6.4 | 6.4 | 373 | 370 | 151.4 | 16.54 | 117.5 | .629 | -40 |
| III | Butyrate of Pentaerythritol | | | 7.6 | | | 538 | 542 | 19.26 | 3.72 | 80 | .788 | -65 |
| III | Butyrate of Dipentaerythritol | | | .85 | | | 498 | 495 | 121.7 | 13.35 | 111 | .664 | -25 |
| III | Butyrate of Polypentaerythritol | | | .5 | | | | 503 | 157.9 | 16.4 | 113 | .641 | -45 |

[1] Acidity expressed as mg. KOH equivalent to 1 g. ester.

Table II
PROPERTIES OF OIL BLENDS OF OLEATE OF MODIFIED PENTAERYTHRITOL

| Base Oil | Conc. Product of Example I | K. V. Centistokes | | V. I. | ASTM Slope | Pour, °F. |
|---|---|---|---|---|---|---|
| | | 100° F. | 210° F. | | | |
| | Per cent | | | | | |
| SAE 10 grade Oil | 0 | 35.74 | 5.69 | 108.5 | .739 | 5 |
| | 5 | 37.96 | 6.03 | 113.5 | .729 | 0 |
| | 10 | 40.55 | 6.43 | 118 | .713 | 5 |
| | 30 | 54.72 | 8.30 | 126 | .671 | 5 |
| | 100 | 175.3 | 23.16 | 133.5 | .541 | -15 |

The A. S. T. M. slope and the viscosity index both express the susceptibility of an oil to change in viscosity with change in temperature. The A. S. T. M. slope is the geometrical slope of the straight line which results from the plotting of viscosity-temperature data on a standard A. S. T. M. chart. It is most precisely obtained through use of the equation:

$$\text{Slope} = 2.54\,[\log\log(c.\ s._{100°\,F.} + 0.60) - \log\log(c.\ s._{210°\,F.} + 0.60)]$$

The lower the numerical value of the slope the more nearly horizontal is the line and the less susceptible is the oil to change in viscosity with change in temperature. The viscosity index is a more familiar but less reliable system of rating. For two oils of widely differing viscosities, the oil of poorer viscosity-temperature relationship may actually have the higher (better) viscosity index. Such an anomaly is illustrated in lines 2 and 4 of Table I, where the true comparative rating is indicated by the A. S. T. M. slopes.

What is claimed is:

1. The process which comprises reacting thiodiglycol with pentaerythritol, in a ratio of between about 0.3 mol and about 0.9 mol of thiodiglycol per mol of pentaerythritol, at a temperature falling within the range varying between about 145° C. and about 250° C., and in the presence of an acid catalyst, to produce a reaction product; and esterifying said reaction product with an esterification reagent selected from the group consisting of aliphatic monocarboxylic acids, anhydrides of aliphatic monocarboxylic acids, and acid chlorides of aliphatic monocarboxylic acids, at a temperature falling within the range varying between about 145° C. and about 250° C.

2. A process which comprises reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of an acid catalyst, to produce a reaction product; and esterifying said reaction product with an aliphatic monocarboxylic acid, at a temperature falling within the range varying between about 145° C. and about 175° C.

3. A process which comprises reacting thiodiglycol with pentaerythritol, in a ratio of between about 0.3 mol and about 0.9 mol of thiodiglycol per mole of pentaerythritol, at a temperature falling within the range varying between about 145° C. and about 175° C., and in the presence of an acid catalyst, to produce a reaction product; and esterifying said reaction product with an aliphatic monocarboxylic acid containing between about 2 carbon atoms and about 18 carbon atoms per molecule, at a temperature falling within the range varying between about 145° C. and about 175° C.

4. A process which comprises reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of p-toluene sulfonic acid monohydrate, to produce a reaction product; and esterifying said reaction product with butyric acid, at a temperature falling within the range varying between about 145° C. and about 175° C.

5. A process which comprises reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of p-toluene sulfonic acid monohydrate, to produce a reaction product; and esterifying said reaction product with oleic acid, at a temperature falling within the range varying between about 146° C. and about 175° C.

6. As a new composition of matter, the product obtained by reacting thiodiglycol with pentaerythritol, in a ratio of between about 0.3 mol and about 0.9 mol of thiodiglycol per mol of pentaerythritol, at a temperature falling within the range varying between about 145° C. and about 250° C., and in the presence of an acid catalyst, to produce a reaction product; and esterifying said reaction product with an esterification reagent selected from the group consisting of aliphatic monocarboxylic acids, anhydrides of aliphatic monocarboxylic acids, and acid chlorides of aliphatic monocarboxylic acids, at a temperature falling within the range varying between about 145° C. and about 250° C.

7. As a new composition of matter, the product obtained by reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of an acid catalyst, to produce a reaction product; and esterifying said reaction product with an aliphatic monocarboxylic acid, at a temperature falling within the range varying between about 145° C. and about 175° C.

8. As a new composition of matter, the product obtained by reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of an acid catalyst, to produce a reaction product; and esterifying said reaction product with an aliphatic monocarboxylic acid containing between about 2 carbon atoms and about 18 carbon atoms per molecule, at a temperature falling within the range varying between about 145° C. and about 175° C.

9. As a new composition of matter, the product obtained by reacting thiodiglycol with pentaerythritol, in a ratio of between about 0.3 mol and about 0.9 mol of thiodiglycol per mol of pentaerythritol, at a temperature falling within the range varying between about 145° C. and about 175° C., and in the presence of p-toluene sulfonic acid, to produce a reaction product; and esterifying said reaction product with butyric acid, at a temperature falling within the range varying between about 145° C. and about 175° C.

10. As a new composition of matter, the product obtained by reacting thiodiglycol with pentaerythritol in a ratio of between about 0.3 mol and about 0.9 mol of thiodiglycol per mol of pentaerythritol, at a temperature falling within the range varying between about 145° C. and about 175° C., and in the presence of p-toluene sulfonic acid monohydrate, to produce a reaction product; and esterifying said reaction product with oleic acid, at a temperature falling within the range varying between about 145° C. and about 175° C.

FREDERICK B. AUGUSTINE.

No references cited.